(No Model.)

G. A. NELSON.
RUB IRON FOR WAGON BEDS.

No. 449,425. Patented Mar. 31, 1891.

WITNESSES
A. J. Schwartz
J. F. Reily

Geo. A. Nelson.
INVENTOR:
By W. Fitzgerald
Attorney

UNITED STATES PATENT OFFICE.

GEORGE A. NELSON, OF WOODS, TEXAS.

RUB-IRON FOR WAGON-BEDS.

SPECIFICATION forming part of Letters Patent No. 449,425, dated March 31, 1891.

Application filed October 11, 1890. Serial No. 367,772. (No model.)

*To all whom it may concern:*

Be it known that I, GEORGE A. NELSON, a citizen of the United States, residing at Woods, in the county of Panola and State of Texas, have invented certain new and useful Improvements in Rub-Irons for Wagon-Beds; and I do hereby declare the following to be a full, clear, and exact description of the invention, such as will enable others skilled in the art to which it appertains to make and use the same.

My invention has relation to improvements in rub-rollers or rub-irons, the object of which is to protect that part of a wagon-bed with which the forward wheels of the wagon come in contact when turning.

Figure 1:
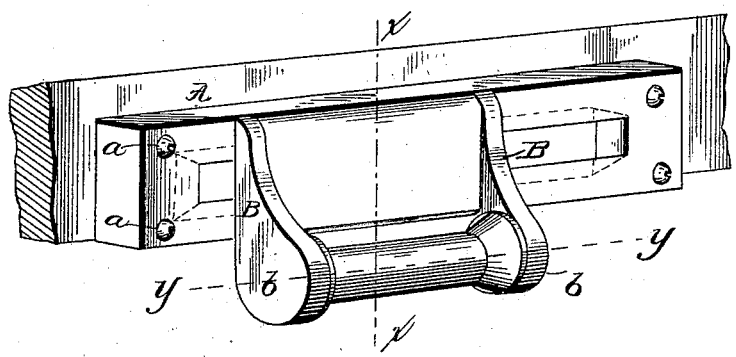
Figure 2:
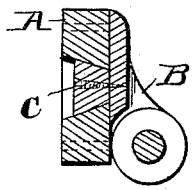
Figure 3:
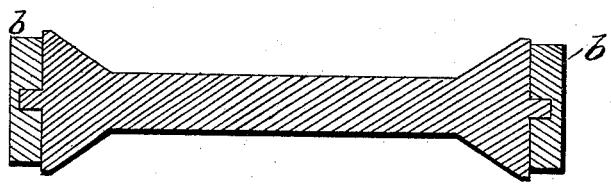

In the accompanying drawings, made a part of this specification, Figure 1 is a perspective view of my invention as applied to use. Fig. 2 is a transverse section on line *x x*, while Fig. 3 is a longitudinal section on line *y y*.

Briefly described, my invention consists in placing a roller at that point of the wagon-bed with which the wheels come in contact when the wagon is turned. I properly mount this roller so that it will revolve with the action of the wheels, and I also prefer to so mount it that it will have a longitudinal movement as well as a rotation.

Referring in detail to the several parts of my invention by letter, A is the body proper of my invention, which consists of a piece of iron or other suitable material, formed with suitable holes *a*, so that it may be securely attached to the side of a wagon-bed by means of bolts or screws, and further provided with the longitudinal slot, the object of which is to form a guide for the bearings B of the rub-roller. Said bearings B are formed, preferably, in one piece, having the downwardly-extending points *b*, between which the roller is loosely mounted, by having the extended axles thereof to project through said extended ends *b*.

To the rear side of the bearings is secured by screws, rivets, or otherwise a longitudinal rib C, the outer side of which is wider than its inner side or point of attachment with the bearings, said rib being somewhat triangular in cross-section, as shown in Fig. 2. This rib is mounted in the guide formed in the body A, and will allow the bearings to move forward or backward in said slot by the action of the wheels. The roller is preferably made so that each end thereof will be somewhat cone-shaped in form, as shown in Fig. 1. By thus enlarging the ends of the roller the wheels will not be permitted to slip out of contact therewith, and will also have the effect of enabling the wheel to move the roller along in the slot formed in the body to such point, as will be readily understood. I also reserve the right to make my roller of the same diameter throughout, and also to adjust the same securely in one place upon the side of the wagon-bed when it is desired that the roller shall be stationary.

In operation, the roller is secured to the side of the wagon-bed at that point where the forward wheels usually strike the bed when the vehicle is turned, and being so placed the wheel will strike the roller and will rotate the same, and it will be seen that the advantage resulting from the use of my invention will be that the vehicle will be readily turned within a small inclosure and at the expense of less friction, and at the same time the wagon-bed will be protected from injury by contact with the wheels.

Believing that the advantages, operation, and construction of my invention will be readily understood from the foregoing description, further reference thereto is thought to be unnecessary.

Having thus described my invention, what I claim as new, and desire to secure by Letters Patent, is—

1. The anti-friction device consisting of the body A, having the longitudinal slot in which is mounted the sliding bearings, the roller loosely secured in said bearings and adapted to slide with the pressure of the wheels, substantially as set forth.

2. The combination of the body having the longitudinal slot, the sliding bearings having the transverse triangular rib adapted to fit said slot, the roller loosely mounted in the bearings and having each end thereof properly enlarged, so as to engage and retain the wheels, substantially as set forth.

3. The rub-roller herein described and shown, consisting of the bearings having the triangular rib, the body A, provided with the longitudinal slot, the roller having the enlarged ends loosely mounted between the extended ends of the bearings, substantially as set forth.

In testimony whereof I affix my signature in presence of two witnesses.

GEO. A. NELSON.

Witnesses:
    A. C. TIMS,
    J. W. KNIGHT.